(12) United States Patent
Sudarsan et al.

(10) Patent No.: US 11,012,504 B2
(45) Date of Patent: May 18, 2021

(54) METHOD AND APPARATUS FOR QUERY SELECTION AND ADMISSION (QSA) OPTIMIZATION FOR IOT AND OTHER APPLICATIONS

(71) Applicant: ALCATEL LUCENT, Boulogne-Billancourt (FR)

(72) Inventors: Padmavathi Sudarsan, Naperville, IL (US); Subhasis Laha, Naperville, IL (US); Subramanian Vasudevan, Morristown, NJ (US); Pramod Adharapurapu, Bangalore (IN); Satish Kanugovi, Bangalore (IN)

(73) Assignee: ALCATEL LUCENT, Boulogne-Billancourt (FR)

( * ) Notice: Subject to any disclaimer, the term of this patent is extended or adjusted under 35 U.S.C. 154(b) by 28 days.

(21) Appl. No.: 16/312,786

(22) PCT Filed: Jun. 27, 2017

(86) PCT No.: PCT/IB2017/000977
§ 371 (c)(1),
(2) Date: Dec. 21, 2018

(87) PCT Pub. No.: WO2018/002724
PCT Pub. Date: Jan. 4, 2018

(65) Prior Publication Data
US 2019/0342381 A1 Nov. 7, 2019

(30) Foreign Application Priority Data
Jun. 28, 2016 (IN) .............................. 201641022205

(51) Int. Cl.
*H04L 29/08* (2006.01)
*G06F 16/2455* (2019.01)
(Continued)

(52) U.S. Cl.
CPC ............ *H04L 67/1023* (2013.01); *G06F 9/46* (2013.01); *G06F 9/505* (2013.01); *G06F 9/5083* (2013.01);
(Continued)

(58) Field of Classification Search
CPC ..... H04L 67/10; H04L 67/1023; G06F 9/505; G06F 9/5083; G06F 16/24568; G06F 17/30; G06F 17/30516; G06F 9/46
(Continued)

(56) References Cited

U.S. PATENT DOCUMENTS 9,167,445 B2 * 10/2015 Hedlund ............. H04L 43/0882
2004/0228278 A1 * 11/2004 Bruckman .............. H04L 47/10
370/231

(Continued)

OTHER PUBLICATIONS

F. Tang, Z. M. Fadlullah, B. Mao and N. Kato, "An Intelligent Traffic Load Prediction-Based Adaptive Channel Assignment Algorithm in SDN-IoT: A Deep Learning Approach," in IEEE Internet of Things Journal, vol. 5, No. 6, pp. 5141-5154, Dec. 2018. (Year: 2018).*

(Continued)

*Primary Examiner* — John A Follansbee
*Assistant Examiner* — James N Fiorillo
(74) *Attorney, Agent, or Firm* — Kramer Amado

(57) ABSTRACT

Various exemplary embodiments relate to a method for determining whether to admit a query in a network, the method including determining a load for a network element type based on an adaptive history for that network element type; determining a cost of admitting the query based on the relative load that the query generates accounting for the amount of traffic the network element has admitted in the past; decreasing a total cost of all queries that can be budgeted during a subsequent interval when the change in load is within a specified range; increasing the total cost of (Continued)

all queries that can be budgeted during a subsequent interval when the change in load is below a threshold; and adding the query to a data structure which keeps track of potentially admittable queries.

20 Claims, 6 Drawing Sheets

(51) Int. Cl.
*G06F 9/50* (2006.01)
*G06F 9/46* (2006.01)

(52) U.S. Cl.
CPC ........ *G06F 16/24568* (2019.01); *H04L 67/10* (2013.01)

(58) Field of Classification Search
USPC ........................................................ 709/223
See application file for complete search history.

(56) References Cited

U.S. PATENT DOCUMENTS

| | | | | |
|---|---|---|---|---|
| 2008/0103866 A1* | 5/2008 | Wiener | ............... | G06Q 10/06 705/7.24 |
| 2009/0313635 A1* | 12/2009 | Dasdan | ............... | G06F 9/5083 718/105 |
| 2011/0173329 A1* | 7/2011 | Zhang | ............... | G06F 1/3206 709/226 |
| 2012/0130625 A1* | 5/2012 | Srivastava | ........... | G08G 1/0133 701/119 |
| 2014/0092731 A1* | 4/2014 | Gupta | .................. | H04W 76/27 370/229 |
| 2015/0163289 A1* | 6/2015 | Paul | ..................... | H04L 43/0817 709/201 |
| 2015/0248462 A1* | 9/2015 | Theeten | ............ | G06F 16/24524 707/688 |
| 2015/0249583 A1* | 9/2015 | Vojnovic | ................. | H04L 47/70 709/224 |
| 2016/0270054 A1* | 9/2016 | Kim | ................... | H04W 74/0808 |
| 2017/0041419 A1* | 2/2017 | Zhong | ................. | H03M 7/6088 |
| 2017/0050111 A1* | 2/2017 | Perry | ...................... | H04L 67/10 |
| 2017/0093915 A1* | 3/2017 | Ellis | ....................... | H04L 67/306 |
| 2017/0094592 A1* | 3/2017 | Tabatabaei | ............. | G06N 20/10 |
| 2017/0177546 A1* | 6/2017 | Heinz | ................... | G06T 11/206 |
| 2018/0049108 A1* | 2/2018 | Yang | .................. | H04L 47/2475 |
| 2018/0295045 A1* | 10/2018 | Bali | ........................ | H04L 43/10 |
| 2019/0342381 A1* | 11/2019 | Sudarsan | ............. | G06F 9/5083 |
| 2020/0084106 A1* | 3/2020 | Johnson | ............. | H04L 41/5009 |

OTHER PUBLICATIONS

F. Tang, Z. M. Fadlullah, B. Mao and N. Kato, "An Intelligent Traffic Load Prediction-Based Adaptive Channel Assignment Algorithm in SDN-IoT: A Deep Learning Approach," in IEEE Internet of Things Journal, vol. 5, No. 6, pp. 5141-5154, Dec. 2018. (Year: 2018) (Year: 2018).*

* cited by examiner

METHOD AND APPARATUS FOR QUERY SELECTION AND ADMISSION (QSA) OPTIMIZATION FOR IOT AND OTHER APPLICATIONS

TECHNICAL FIELD

Various exemplary embodiments disclosed herein relate generally to computer networking.

BACKGROUND

Internet of Things (IoT) operates in a space where there may potentially be a massive number of devices (20-100 billion predicted by 2020) adding huge demands of varying nature on the network. The IoT ecosystem needs to address a diverse user base across different vertical markets including industrial applications, smart homes, telematics, wearables, connected cars, utilities, eHealth, etc. Each of these vertical markets and devices are addressed by IoT devices that vary from a simple sensor/actuator to smart devices. The nature of the queries to and from the IoT devices depends on the application and the device characteristics and can vary from a simple non-time-critical request from a large number of devices to a complex time-critical query.

Characteristics of IoT devices include, for example, duty cycle, security, battery life, range, reliability, mobility and its relative speed, number of devices, data volume, and data rate. While all the listed attributes define the characteristics of the IoT devices, depending on the type of application, a subset of these attributes may apply.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for determining whether to admit a query in a network, the method including determining a load for a network element type based on an adaptive history for that network element type; determining a cost of admitting the query based on the relative load that the query generates accounting for the amount of traffic the network element has admitted in the past; decreasing a total cost of all queries that can be budgeted during a subsequent interval when the change in load is within a specified range; increasing the total cost of all queries that can be budgeted during a subsequent interval when the change in load is below a threshold; and adding the query to a data structure which keeps track of potentially admittable queries.

Various further exemplary embodiments relate to a device for determining whether to admit a query in a network, the device including: a memory; and a processor configured to: determine a load for a network element type based on an adaptive history for that network element type; determine a cost of admitting the query based on the relative load that the query generates accounting for the amount of traffic the network element has admitted in the past; decrease a total cost of all queries that can be budgeted during a subsequent interval when the change in load is within a specified range; increase the total cost of all queries that can be budgeted during a subsequent interval when the change in load is below a threshold; and add the query to a data structure which keeps track of potentially admittable queries.

Various further exemplary embodiments relate to a data storage device encoding a program in non-transitory machine readable and machine-executable form, the program including instructions to: determine a load for a network element type based on an adaptive history for that network element type; determine a cost of admitting the query based on the relative load that the query generates accounting for the amount of traffic the network element has admitted in the past; decrease a total cost of all queries that can be budgeted during a subsequent interval when the change in load is within a specified range; increase the total cost of all queries that can be budgeted during a subsequent interval when the change in load is below a threshold; and add the query to a data structure which keeps track of potentially admittable queries.

BRIEF DESCRIPTION OF THE DRAWINGS

In order to better understand various exemplary embodiments, reference is made to the accompanying drawings, wherein.

DETAILED DESCRIPTION

Figure 1:
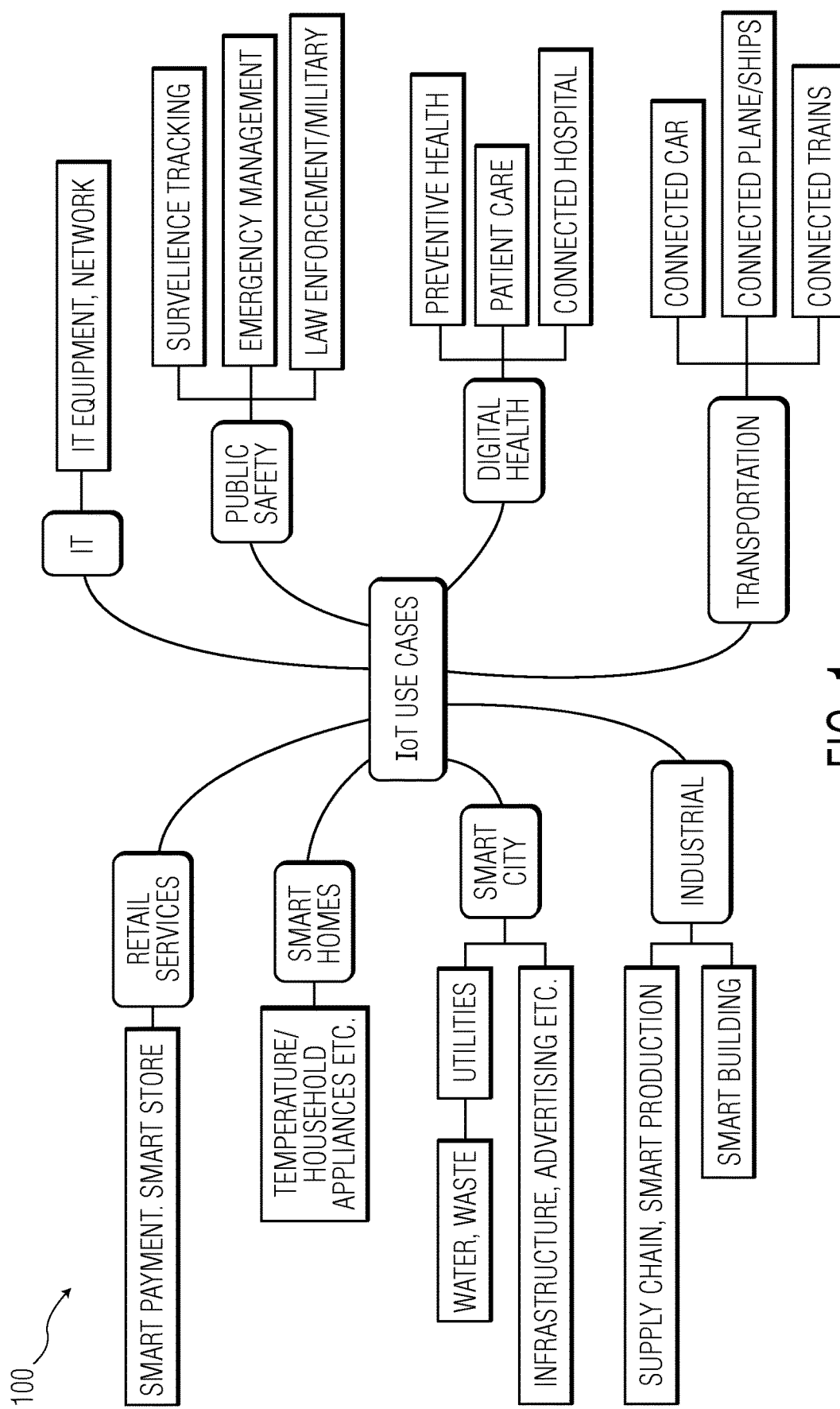
FIG. 1 illustrates IoT verticals with examples of applications.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or" refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein.

Referring now to the drawings, in which like numerals refer to like components or steps, there are disclosed broad aspects of various exemplary embodiments.

FIG. 1 illustrates IoT verticals with examples of applications 100. These IoT applications may overwhelm the network even if the packets are small, by virtue of their sheer number (volume). This may have negative impact on the non-IoT traffic and user experience. Thus, there needs to be a mechanism to ensure the mission-critical requests are treated with higher priority over a non time critical request. For instance, meter readings from hundreds of thousands of devices may be delayed a few minutes in order to handle a request to read/address a query from a health monitor.

A solution is needed to optimize the flood of queries from the application server in order to process requests/responses to/from the IoT devices in an intelligent manner to maximize quality of user experience as well as to make the most effective use of network resources.

No solutions are known to exist for handling and controlling massive number of queries to completely diverse types of IoT devices over a cellular network. Selection and admission control mechanisms for such plethora of queries that are required for optimum handling of diverse IoT applications taking into account availability of network wide resources have not been addressed today.

Enhanced access class barring addresses may only be a very small segment of the admittance of a select class of queries and may not be sufficient to handle a large variety of queries, and does not take into account the availability and occupancy of upstream nodes. It does not undertake the comprehensive and adaptive approach of disclosed embodiments which dynamically adjust the admission of queries based on the current load of all the involved network elements. Management systems (such as, Element Management System (EMS)) have mechanisms to address prioritizing and queuing of requests. This, though, is only taking into account its own resources (a single box) and, in some cases, the interface to the next hop. None of these existing mechanisms address the needs of a variety of queries, taking into account the resources in the end to end (E2E) system that may be involved in handling the query.

Embodiments described, provide methods to dynamically optimize the Query Selection and Admission (QSA) of IoT and other applications, by using network policy information, current network state information, subscriber information and application information. Embodiments may substantially optimize network traffic and provide better quality of service and user experience.

Figure 2:
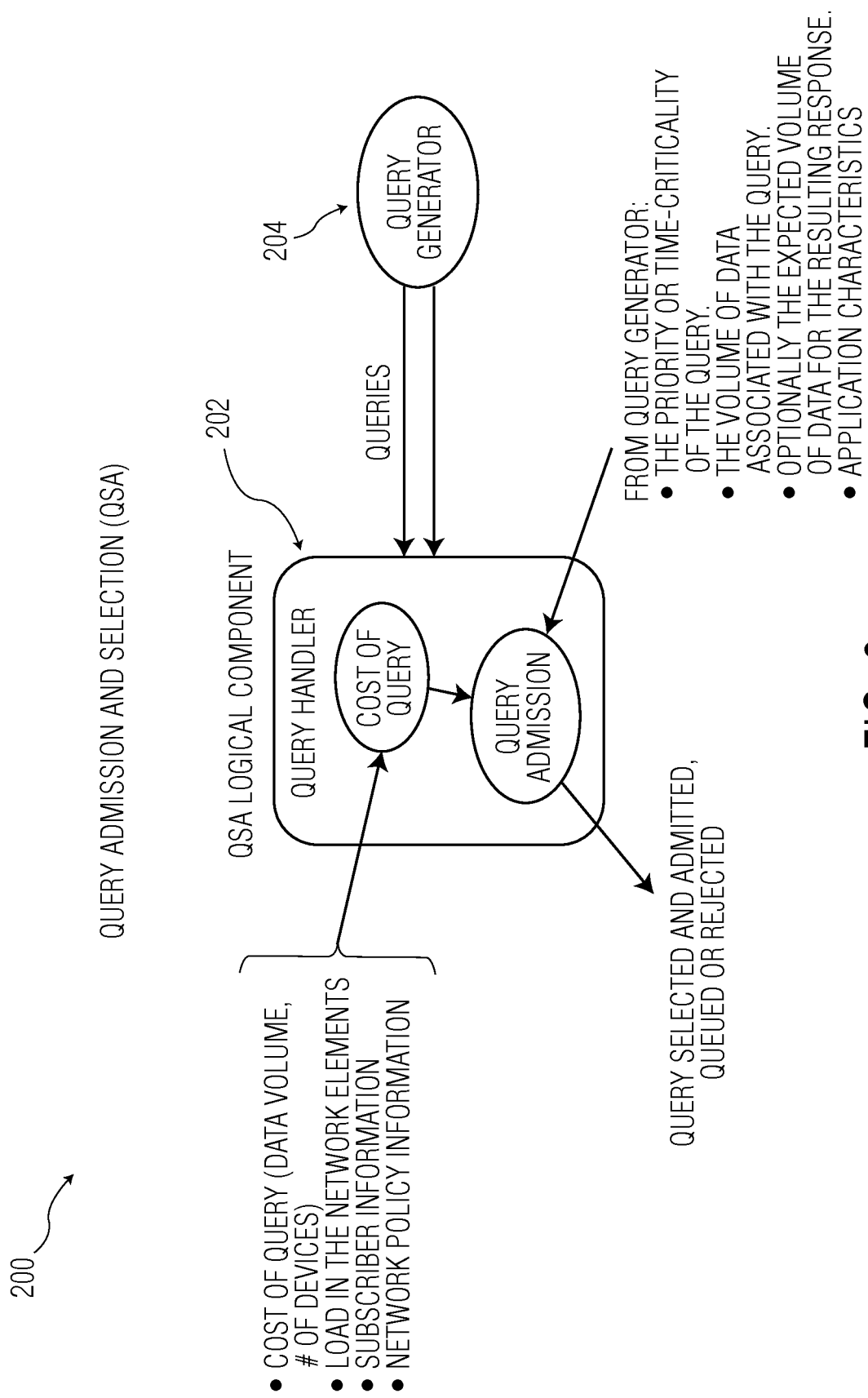
FIG. 2 illustrates an embodiment of the query admission and selection system.

FIG. 2 illustrates an embodiment of the query admission and selection system 200. The system 200 may include a query handler 202 and query generator 204.

Query Generator (May Reside, for Example, in the Application Server (AS)):

The Query Generator, such as query generator 202, may be a functional entity, associated with the IoT application, which sends queries to IoT devices/controllers and receives queried response and/or autonomous information from the devices/controllers.

Query Handler (May Reside in the Communication Network Like SCEF (Service Capability Exposure Function)):

The Query Handler, such as query handler 204, may be a functional entity that utilizes network/application/device related information to support admission/selection of IoT queries in an optimized manner. After receiving a query from the Query Generator with indication of its priority/criticalness, the Query Handler decides if the query should be admitted/transmitted, queued, or, rejected/dropped.

Query Admission by Query Handler:

When the Query Generator sends a query, it may include the following information:

The priority or time-criticality of the query.

The expected volume of data for the resulting response. It is assumed that the volume of data associated with the query may be known to the Query Handler.

Application/device characteristic (s)

Based on the above information provided by the Query Generator, the current network conditions, network policy, subscription class and additional device characteristics, the Query Handler may determine if a query will be admitted/transmitted, or queued for later delivery, or rejected/dropped, under current conditions.

Disclosed embodiments may be applied to cellular network as well as to other communication technologies (for example, LoRA, Zigbee etc.) without forcing the operator to select a single technology. Some IoT devices can support multiple technologies simultaneously and therefore the ability to implement different embodiments across any technology is very beneficial. Also, the disclosed embodiments may be applicable to other types of devices, i.e., other than IoT devices, and applications that send a large volume of queries over a network.

Details of the Query Selection and Admission (QSA) Algorithm

The following algorithm is based on the current load of the relevant network elements and the cost of query, as defined below. The Selection and Admission of a query may be determined by its time-criticalness in the following order:

1. Mission-critical query (query of highest time-criticalness, such as related to emergency health services)
   The mission-critical queries are admitted/selected unconditionally.
2. Time-Critical (the queries for which a quick response is needed, but it is not as critical as a mission-critical query) and Non-time-critical
   After all the mission-critical queries are admitted, the following algorithm may be applied for Selection and Admission of the remaining queries.

The actual number of tiers of criticalness may be different from the above list. The above list illustrates the concept. Subscription class of the query may be taken into account for each query and factored into the order in which queries are admitted.

The following algorithm may be applied repeatedly over consecutive time intervals, each with duration of T msec. During each of these intervals, the admission of the queries may be determined by considering the current load of each type of Network Element (NE) and the relative load that the query generates. This may be performed separately for downlink and uplink directions.

Algorithm for the Downlink Direction:

The parameters used for this algorithm in the downlink direction include:

$Load_{DL\_NE}$ may be the representative DL load of the NE of type i at the beginning of that interval for i=1 to N:
$Load_{DL\_NE}$=(Average DL Load of all NE of type i)+ (n*$\sigma_i$ (Standard Deviation) of DL Load of all NE of type i), where n is a positive number that permits fine-tuning of the aggressiveness of the algorithm.

$Load_{DL\_NE}$ may be expressed as the percentage of capacity of the NE currently being used.

$Cost_{QDL}$ may be the cost of a query in the DL direction. It represents the relative DL load that the query generates:
$Cost_{QDL}$=($W_{DL1}$*DL Data volume of the query)* ($W_{DL2}$(# of devices to be queried, # of NE of the given type)), where $W_{DL1}$ and $W_{DL2}$ are weighting factors and $W_{DL2}$ may be a function f(# of devices to be queried, # of NE of the given type).

$Cost\_Adm_{CUR\_DL\_NEi}$ may be the sum of $Cost_{QDL}$ of all queries that can be admitted during the current time interval, considering the load of NE of type i in the DL direction.

For each type of NE (i=1 to N), $Cost\_Adm_{last\_DL\_NEi}$ may be the sum of $Cost_{QDL}$ of all queries that were actually admitted during the last time interval.

$X_{Init\_DL\_NEi}$ represents the total cost of all queries that can be budgeted during the initial interval and may be a function f($Load_{DL\_NEi}$, total capacity of NE of type i).

$X_{Last\_DL\_NEi}$ represents the total cost of all queries that can be budgeted during the subsequent interval and may be calculated by the algorithm.

$\Delta_{DL\_Th1}$, $\Delta_{DL\_Th2}$ and $\Delta_{DL\_Max}$ are different thresholds used in the algorithm and are functions of $Load_{DL\_NEi}$, where $\Delta_{DL\_Th2} < \Delta_{DL\_Th1} < \Delta_{DL\_Max}$ Over last n time intervals, $\Delta_{DL\_Load\_NEi}$ may be the change in DL load of NE of type i, averaged over last n intervals:

$\Delta_{DL\_Load\_NEi}$=(DL Load at the end of last (nth) interval−DL Load at the beginning of the first interval)/n $Thresh_{High\_DL}$ may be the upper limit of load beyond which no queries can be admitted.

During Each Time Interval of Duration of T Msec:

At first, all mission-critical queries are admitted. After that, the other queries are considered for admission.

The queries are ordered for selection based on a policy that is predetermined based on query related parameters such as time criticality, $Cost_{QDL}$, subscription class, QCI, Age etc. The same policy is applied for NEs of all types.

During the First Time Interval (All mission-critical queries are admitted first) the following algorithm may be performed in Table 1:

TABLE 1

For (Type of NE i = 1 to N)
/* N is the total number of types of relevant NEs */
Begin
    Cost_Adm$_{CUR\_DL\_NEi}$ = Sum of Cost$_{QDL}$ of all mission-critical queries admitted.
    X$_{last\_DL\_NEi}$ = X$_{Init\_DL\_NEi}$
    If Load$_{DL\_NEi}$ > Thresh$_{High\_DL}$
      do not admit any more queries
    Else
      While ((X$_{last\_DL\_NEi}$ − Cost_Adm$_{CUR\_DL\_NEi}$) ≥ (Cost$_{QDL}$ of next query))
        Add query to the potential list for NE i
        Cost_Adm$_{CUR\_DL\_NEi}$ = Cost_Adm$_{CUR\_DL\_NEi}$ + Cost$_{QDL}$ of added query
      Continue
End
Select the set of NE queries that is allowed in all types of NEs (can be deduced from the potential list for NE i) for consideration of admission.

Figure 3:
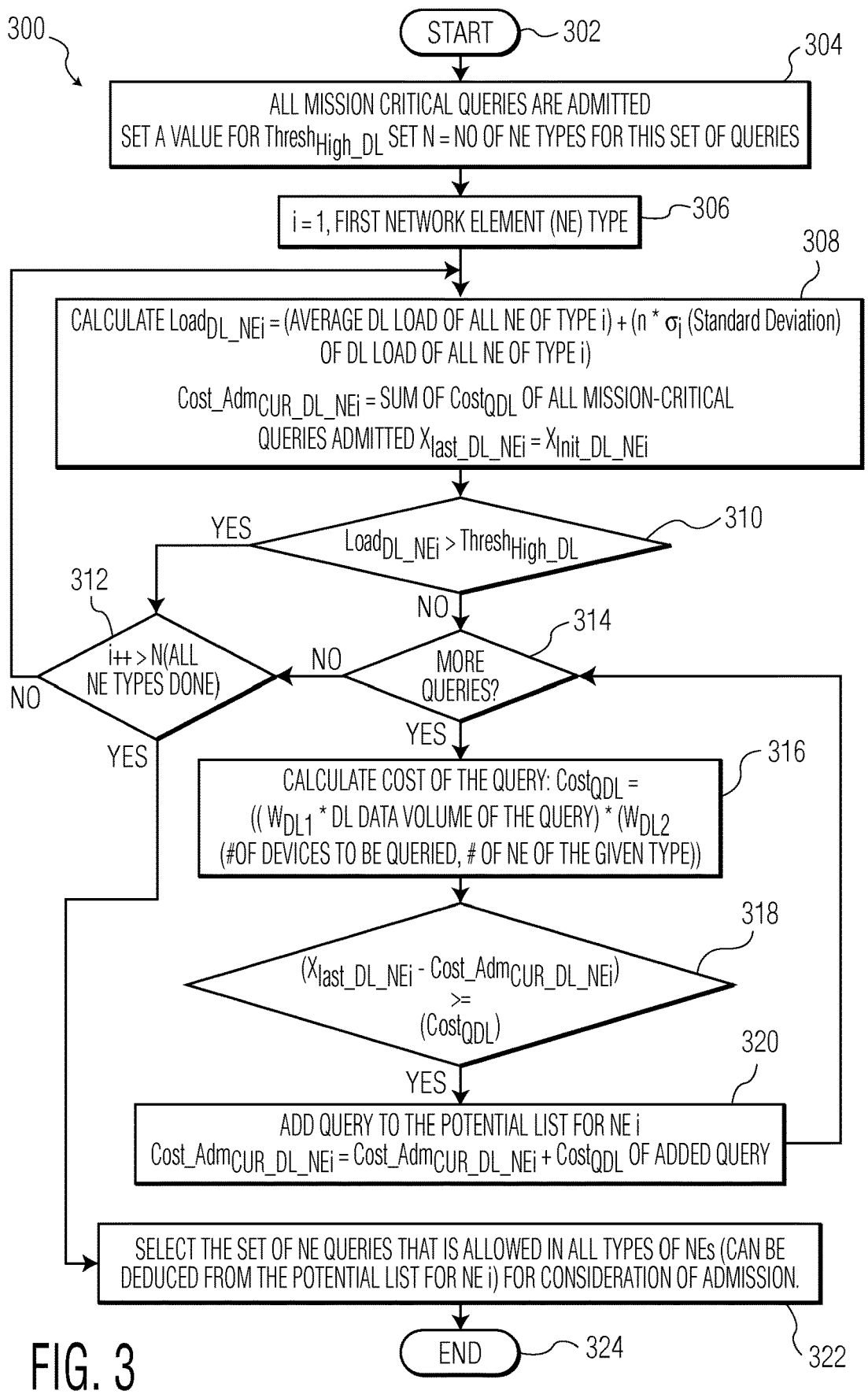
FIG. 3 illustrates a flow diagram of the first time interval.

FIG. 3 illustrates a flow diagram of the first time interval 300. Query handler may begin in step 302 and proceed to step 304. In step 304 the query handler may admit all mission critical queries. In step 304, the query handler may also set a value for $Thresh_{High\_DL}$ and set N=number of Network Element (NE) types for this set of queries. Query handler may then proceed to step 306.

In step 306, the query handler may assign a variable such as i equal to 1 to indicate the first NE type. Query handler may then proceed to step 308.

In step 308, query handler may calculate $Load_{DL\_NEi}$= (Average Downlink (DL) Load of all NE of type i)+(n*$\sigma_i$ (Standard Deviation) of DL Load of all NE of type i). Similarly, query handler may calculate the Cost_Adm$_{CUR\_DL\_NEi}$=Sum of Cost$_{QDL}$ of all mission-critical queries admitted and assign $X_{last\_DL\_NEi} = X_{Init\_DL\_NEi}$. $X_{Last\_DL\_NEi}$ may represent the total cost of all queries that may be budgeted during the subsequent interval and may be calculated by the algorithm. $X_{Init\_DL\_NEi}$ may represent the total cost of all queries that may be budgeted during the initial interval and may be a function f($Load_{DL\_NEi}$, total capacity of NE of type i). Query handler may then proceed to step 310.

In step 310 query handler may determine whether $Load_{DL\_NEi} > Thresh_{High\_DL}$. When $Load_{DL\_NEi} > Thresh_{High\_DL}$ then the query handler may proceed to step 312. When the $Load_{DL\_NEi} > Thresh_{High\_DL}$ is not true, then query handler may proceed to step 314.

In step 312 query handler may increment i and determine whether all NE types are finished. When all NE types are not done, query handler may return to step 308. When all NE types have finished, query handler may proceed to step 322.

In step 314 the query handler may determine whether there are more queries. When no more queries exist then query handler may proceed to step 312. When more queries do exist, query handler may proceed to step 316.

In step 316, query handler may calculate cost of the query according to: $Cost_{QDL}$=(($W_{DL1}$*DL Data volume of the query)*($W_{DL2}$(# of devices to be queried, # of NE of the given type)), where $W_{DL1}$ and $W_{DL2}$ are weighting factors and $W_{DL2}$ is a function f(number of devices to be queried, number of network elements of the given type). Query handler may then proceed to step 318.

In step 318, query handler may perform the following calculations and comparisons: ($X_{last\_DL\_NEi}$−Cost_Adm$_{CUR\_DL\_NEi}$)>=(Cost$_{QDL}$). This comparison may keep the query handler admitting queries so long as the overall cost is less than the downlink query cost. Query handler may then proceed to step 320.

In step 320, query handler may add a query to the potential list for network element i. Query handler may then assign Cost_Adm$_{CUR\_DL\_NEi}$=Cost_Adm$_{CUR\_DL\_NEi}$+Cost$_{QDL}$ of the added query. Query handler may then proceed to step 314.

In step 322, query handler may select the set of NE queries which are allowed in all types of NE's, which can be deduced from the potential list for NE(i), for consideration of admission. Query handler may then proceed to step 324 where it may stop.

During Subsequent Intervals

During subsequent intervals (after all mission-critical queries are admitted first) the following algorithm may be performed in Table 2:

TABLE 2

For (Type of NE i = 1 to N)
/* N is the total number types of relevant NEs */
Begin TABLE 2-continued Cost_Adm$_{CUR\_DL\_NEi}$ = Sum of Cost$_{QDL}$ of all mission-critical queries admitted
If ((Load$_{DL\_NEi}$ ≥ Thresh$_{High\_DL}$) OR ($\Delta_{DL\_Load\_NEi}$ ≥ $\Delta_{DL\_Max}$))
  do not admit any more queries
  Exit
Else
  If $\Delta_{DL\_Th1}$ < $\Delta_{DL\_Load\_NEi}$ < $\Delta_{DL\_Max}$
    X$_{last\_DL\_NEi}$ = X$_{last\_DL\_NEi}$ / Factor$_{DL1}$
  Else
    If $\Delta_{DL\_Load\_NEi}$ < $\Delta_{DL\_Th2}$
      X$_{last\_DL\_NEi}$ = MIN ((X$_{last\_DL\_NEi}$ * Factor$_{DL2}$), MAX (X$_{last\_DL\_NEi}$, (Cost_Adm$_{last\_DL\_NEi}$ * Factor$_{DL2}$)))
      /* This ensures that when the total cost of queries actually admitted during the last
      interval is smaller than (X$_{last\_DL\_NEi}$ / Factor$_{DL2}$), then the value of X$_{last\_DL\_NEi}$ does not
      change. Otherwise, the value of X$_{last\_DL\_NEi}$ may explode to a very large value. */
      /* Factor$_{DL1}$ and Factor$_{DL2}$ are numbers between 1 and 2 */
      /* $\Delta_{DL\_Th2}$ is expected to be negative, particularly when Load$_{DL\_NEi}$ is medium to high.
      It may be set to some small positive value for low values of Load$_{DL\_NEi}$ for an aggressive
      approach */
While ((X$_{last\_DL\_NEi}$ − Cost_Adm$_{CUR\_DL\_NEi}$) ≥ Cost$_{QDL}$ of next query)
  Add query to the potential list for NE i
  Cost_Adm$_{CUR\_DL\_NEi}$ = Cost_Adm$_{CUR\_DL\_NEi}$ + Cost$_{QDL}$ of added query
Continue
End
Select the set of NE queries that is allowed in all types of NEs (can be deduced from the
potential list for NE i) for consideration of admission.

Figure 4:
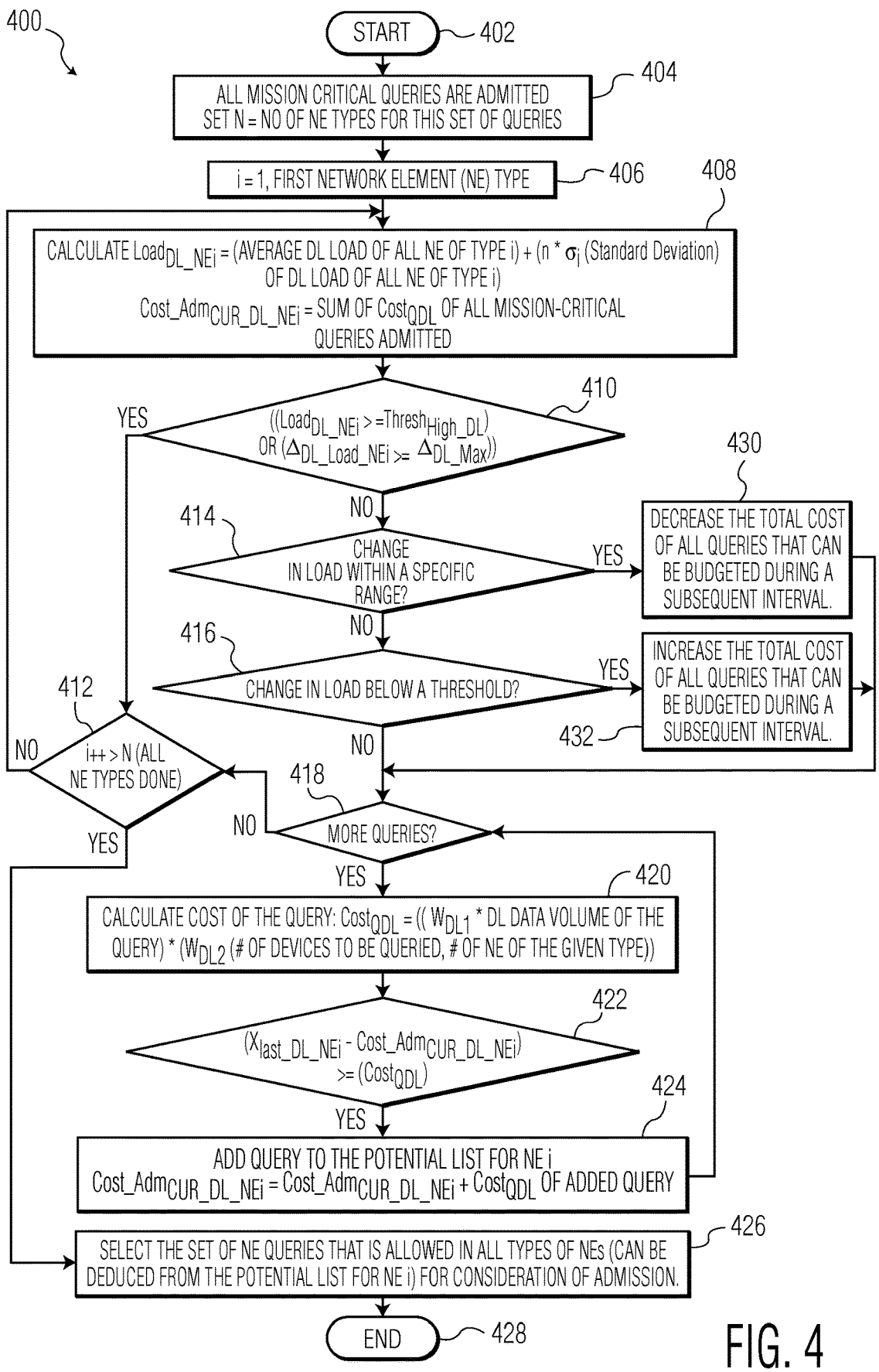
FIG. 4 illustrates a flow diagram of subsequent time intervals.

FIG. 4 illustrates a flow diagram of subsequent time intervals 400. The query handler may begin in step 402 and proceed to step 404.

In step 404, all mission critical queries may be admitted. For example, health care queries may have high priority and are mission critical. The query handler may then proceed to step 406.

In step 406 the query handler may assign a variable such as i equal to 1 to indicate the first NE type. Query handler may then proceed to step 408.

In step 408 the query handler may calculate the downlink load of network element i, according to the following formula:

Load$_{DL\_NEi}$=(Average DL Load of all NE of type $i$)+($n$*$\sigma_i$(Standard Deviation) of DL Load of all NE of type $i$)

Further, in step 408 the query handler may calculate the cost of downlink admission for a current network element, i, according to the following formula:

Cost_Adm$_{CUR\_DL\_NEi}$=Sum of Cost$_{QDL}$ of all mission-critical queries admitted.

The query handler may move on to step 410 where it may compare the load to the set threshold. Similarly, in step 410, the query handler may compare the change in the downlink load of the network element type i, averaged over the last n intervals to a second threshold. These two comparisons may be performed according to the following expressions respectively:

((Load$_{DL\_NEi}$>=Thresh$_{High\_DL}$)OR
($\Delta_{DL\_Load\_NEi}$>=$\Delta_{DL\_Max}$))

When either the downlink load of the network element or the change in the downlink load for the network element is bigger than or equal to its respective threshold, then query handler moves on to step 412 where it increments i, to another network element type. In step 412, the query handler determines whether all network element types are done being processed and moves on to 426 when there are no more network elements, and moves back to step 408 when more network elements remain.

When neither the downlink load of the network element nor the change in the downlink load for the network element is bigger than its respective threshold, then query handler moves on to step 414.

In step 414, query handler may determine if $\Delta_{DL\_Th1}$<$\Delta_{DL\_Load\_NEi}$<$\Delta_{DL\_Max}$. When $\Delta_{DL\_Th1}$<$\Delta_{DL\_Load\_NEi}$<$\Delta_{DL\_Max}$ is true the query handler moves to step 430. When the comparison is not true, the query handler moves on to step 416.

In step 430, the query handler may decrease the total cost of all queries that can be budgeted during a subsequent interval by assigning X$_{last\_DL\_NEi}$=X$_{last\_DL\_NEi}$/Factor$_{DL1}$ and move on to step 418.

In step 416, query handler may determine if the change in load, averaged over last n intervals, is below a threshold using the following expression: $\Delta_{DL\_Load\_NEi}$<$\Delta_{DL\_Th2}$. When $\Delta_{DL\_Load\_NEi}$<$\Delta_{DL\_Th2}$ is true, query handler may move on to step 432. When $\Delta_{DL\_Load\_NEi}$<$\Delta_{DL\_Th2}$ is not true, query handler may move on to step 418.

In step 432, query handler may increase the total cost of all queries that can be budgeted during a subsequent interview by assigning X$_{last\_DL\_NEi}$=MIN ((X$_{last\_DL\_NEi}$*Factor$_{DL2}$), MAX (X$_{last\_DL\_NEi}$, (Cost_Adm$_{last\_DL\_NEi}$*Factor$_{DL2}$))) and then move on to step 418.

In step 418, query handler may determine if more queries exist. When more queries exist, query handler may proceed to step 420. When no more queries exist, query handler may proceed to step 412 where i may be incremented and a determination is made as to whether more NE types exist. When more NE types do exist, query handler may proceed to step 408, otherwise the query handler may proceed to step 426.

In step 420 query handler may calculate cost of the query: Cost$_{QDL}$=(W$_{DL1}$*DL Data volume of the query)*(W$_{DL2}$ (# of devices to be queried, # of NE of the given type))

In step 422, query handler may compare (X$_{last\_DL\_NEi}$−Cost_Adm$_{CUR\_DL\_NEi}$)>=(Cost$_{QDL}$) This comparison may keep the query handler admitting queries so long as the overall cost is less than the downlink query cost.

In step 424, query handler may add query to the potential list for NE I, and assign the cost of the added query by computing: Cost_Adm$_{CUR\_DL\_NEi}$=Cost_Adm$_{CUR\_DL\_NEi}$+Cost$_{QDL}$.

In step 426, query handler may select the set of NE queries that is allowed in all types of NEs (can be deduced from the potential list for NE i) for consideration of admission. Query handler may then proceed to step 428 where it may stop operation.

Algorithm for the Uplink Direction:

Parameters used for this algorithm in the uplink direction may be the same as the corresponding ones in the downlink direction with the string "DL" in the subscript replaced by the string "UL". The resultant parameters include:

$Load_{UL\_NEi}$ may be the representative UL load of the NE of type i at the beginning of that interval for i=1 to N. For some network elements, the load may not be separately discriminated in the downlink and uplink directions. In that case, a single value may be applied for that network element for evaluation in both directions.

$Cost_{QUL}$ may be the cost of a query in the UL direction. It represents the relative UL load that the query generates.

$Cost\_Adm_{CUR\_UL\_NEi}$ may be the sum of $Cost_{QDL}$ of all queries that may be admitted during the current time interval, considering the load of NE of type i in the UL direction.

For each type of NE (i=1 to N), $Cost\_Adm_{last\_UL\_NEi}$ may be the sum of $Cost_{QUL}$ of all queries that were actually admitted during the last time interval.

$X_{Init\_UL\_NEi}$ represents the total cost of all queries that may be budgeted during the initial interval and may be a function of $Load_{UL\_NEi}$ and the capacity of NE of type i.

$X_{Last\_UL\_NEi}$ represents the total cost of all queries that may be budgeted during the subsequent interval and may be calculated by the algorithm.

$\Delta_{UL\_Th1}$, $\Delta_{UL\_Th2}$ and $\Delta_{UL\_Max}$ are different thresholds used in the algorithm and are functions of $Load_{UL\_NEi}$, where $\Delta_{UL\_Th2} < \Delta_{UL\_Th1} < \Delta_{UL\_Max}$ Over last n intervals, $\Delta_{UL\_Load\_NEi}$ may be the change in UL load of NE of type i, averaged over last n intervals.

$ThreshHigh_{UL}$ may be the upper limit of load where any queries may be admitted.

One may note that: $Cost_{QUL} = W_{UL1} *$ UL Data volume of the response $*(W_{UL2}(\#devices\ to\ respond, \#NE\ of\ the\ given\ type))$ where, $W_{UL1}$ and $W_{UL2}$ are weighting factors and $W_{UL2}$ may be a function f(#devices to respond, #NE of the given type).

The logic of algorithm in the Uplink direction may be similar to that in the Downlink direction.

Final Selection of Admitted Queries During a Given Time Interval:

After going through both the DL algorithm and the UL algorithm for a given time interval one may:

Select the set of NE queries that may be allowed in both DL and UL directions for final admission.

For each type of NE (i=1 to N), one may calculate $Cost\_Adm_{last\_DL\_NEi}$ as the sum of $Cost_{QDL}$ of the finally selected set of admitted queries.

For each type of NE (i=1 to N), one may calculate $Cost\_Adm_{last\_UL\_NEi}$ as the sum of $Cost_{QUL}$ of the finally selected set of admitted queries.

In some embodiments, when a query cannot be admitted, it may be simply queued and considered for admission during the next interval. Standard queue management techniques for fair handling of queries may be employed.

If the number of devices that are addressed by a query may be large, the large number of simultaneous responses may overload the network in the UL direction.

For LTE network, this will be taken care of by the eDRX mechanism that, by its inherent nature, has the effect of spreading the queries themselves. As a result, the responses may also be spread out.

For non-LTE network, a similar spreading of the queries may be applied.

One exemplary embodiment may include the following detailed use cases:

| Use Cases | Latency | Packet Size | Mobility | Density of IoT devices | Frequency of data |
| --- | --- | --- | --- | --- | --- |
| Use Case 1: Water metering/monitoring for tanks in apartment building or houses | Non Time-Critical: hours/days | Small (less than 240 bytes) | No | Massive: Order of Millions | Periodic: Bi-weekly/Monthly |
| Use Case 2: Monitoring critical patient information in the hospitals | Mission-Critical: ms/secs | Large >100 Kbytes | No | High: 1000 s | Periodic: secs |
| Use Case 3: Car driving information for insurance purposes | Time-Critical: hours | Large >100 Kbytes | Yes | Huge: Order of 100,000 | Periodic: mins/hours |

In this embodiment, mission critical queries may be admitted unconditionally. Each time interval slice for evaluation of the algorithm may be 10 ms. For this example one may assume that only 2 network elements are involved NE1 and NE2. The ThreshHigh_DL may be set to 85%.

During a First Time Interval:

Queries 1-10 may be associated with use case 1: Water metering request from 10 different cities (non time critical).

Queries 11, Query 12 may be associated with use case 2: Monitoring critical patient information for patience from hospitals. (Mission Critical).

Queries 13-17 may be associated with use case 3: Car driving information for insurance purposes (Time critical).

Mission-critical Queries 11 and 12 may be admitted first without going through the cost evaluation.

Based on a predetermined policy, the remaining queries in this example may be ordered in the following way for admission/selection:

Query 13, Query 15, Query 16, Query 17, Query 14, Query 1, Query 3, Query 5, Query 6, Query 7, Query 4, Query 10, Query 2, Query 8, Query 9.

Downlink Direction:

Load on the NE 1 ($Load_{DL\_NE1}$)=40%.

Load on the NE 2 ($Load_{DL\_NE2}$)=30%.

Based on $Cost_{QDL}$ calculated for each of the queries and the corresponding $X_{init\_DL\_NEi}$ in this case, all queries in DL may be considered for admission.

Uplink Direction:

Load on the NE 1 ($Load_{UL\_NE1}$)=20%.

Load on the NE 2 ($Load_{UL\_NE2}$)=35%.

Based on $Cost_{OUL}$ calculated for each of the queries and the corresponding $X_{init\_UL\_NEi}$ in this case, all queries in UL may be considered for admission.

Therefore after considering both UL and DL, all 17 queries may be admitted during the first time interval. Since the network is only lightly loaded, all IoT queries may be admitted with no negative impact on the user experience of non IoT traffic.

During a Subsequent Time Interval:

Queries 41-50 may be associated with use case 1: Water metering request from 10 different cities (non time critical).

Query 51 is associated with use case 2: Monitoring critical patient information for patience from hospitals. (Mission Critical).

Queries 52-54 may be associated with use case 3: Car driving information for insurance purposes (Time critical).

Mission-critical Query 51 may be admitted first without going through the cost evaluation.

Based on a predetermined policy, the remaining queries in this example may be ordered in the following way for admission/selection:

Query 53, Query 52, Query 54, Query 41, Query 43, Query 45, Query 46, Query 47, Query 44, Query 50, Query 42, Query 48, Query 49.

Downlink Direction:
Load on the NE 1 ($Load_{DL\_NE1}$)=70%.
Load on the NE 2 ($Load_{DL\_NE2}$)=80%.

Based on $Cost_{ODL}$ calculated for each of the queries and the corresponding $X_{last\_DL\_NEi}$ in this case, queries that are considered for admission may include:

By NE1: Query 53, Query 52, Query 54, Query 41
By NE2: Query 53, Query 52, Query 54

Uplink Direction:
Load on the NE 1 ($Load_{UL\_NE1}$)=60%.
Load on the NE 2 ($Load_{UL\_NE2}$)=70%.

Based on $Cost_{OUT}$ calculated for each of the queries and the corresponding $X_{last\_UL\_NEi}$ in this case queries that may be considered for admission include:

By NE1: Query 53, Query 52, Query 54, Query 41, Query 43, Query 45, Query 46
By NE2: Query 53, Query 52, Query 54, Query 41, Query 43

Therefore after considering both UL and DL, queries that are finally admitted during this interval may be Query 53, Query 52, Query 54 in addition to Query 51.

By considering the value and rate of change of recent loads of each type of Network Element (NE) in both DL and UL directions and the relative load that the query generates, only 4 queries may be admitted. This ensures that IoT queries do not impact the user experience of non IoT traffic even when the network is heavily loaded.

Figure 5:
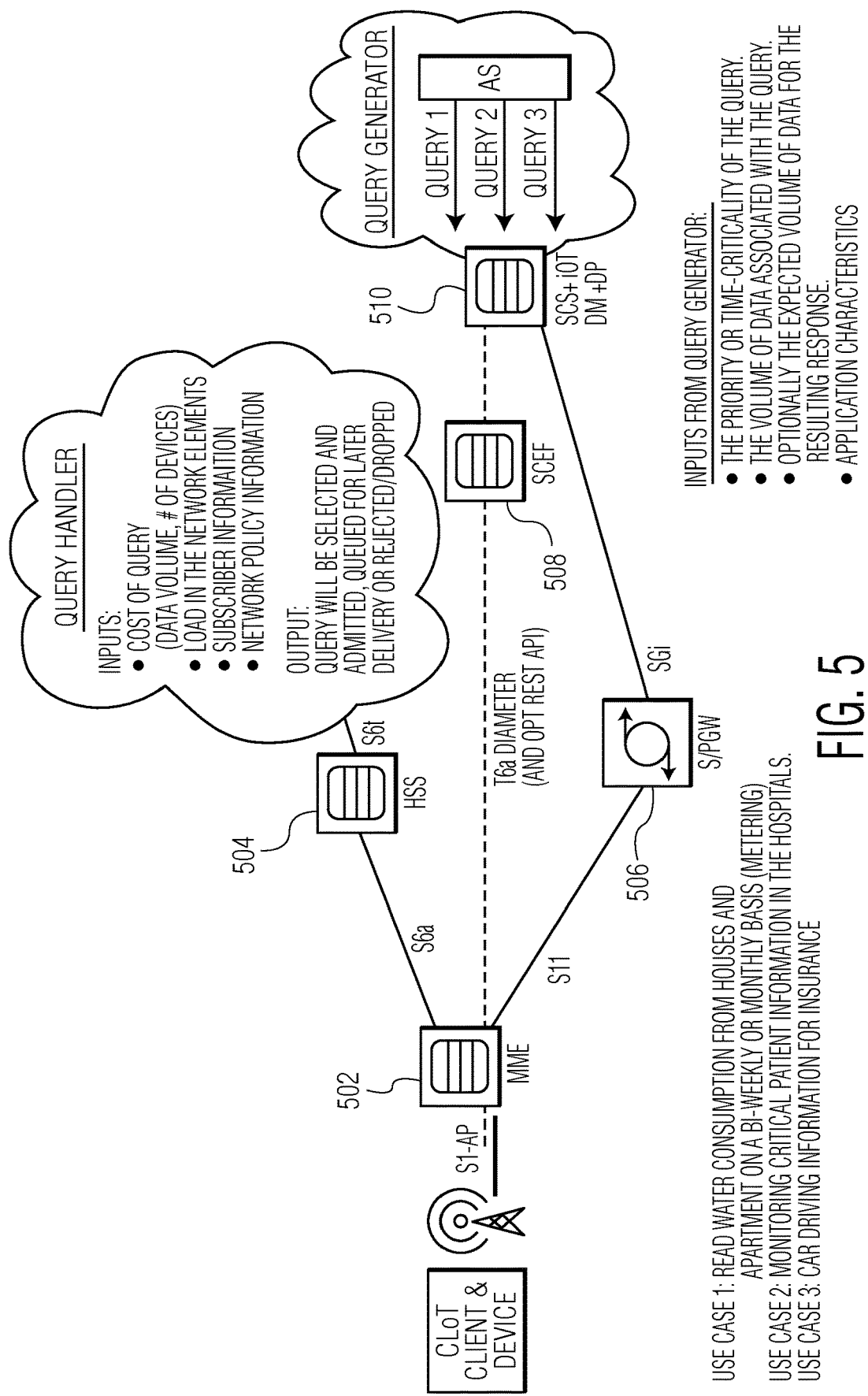
FIG. 5 illustrates an exemplary network environment for disclosed embodiments.

FIG. 5 illustrates an exemplary network environment for disclosed embodiments 500. Exemplary network environment 500 includes exemplary network elements such as a Mobility Management Entity (MME) 502, Home Subscriber Station (HSS) 504, Packet Data Network Gateway (PGW)/Serving Gateway (SGW) 506, Service Capability Entity Function (SCEF) 508, and Service Capability Server (SCS) together with IoT Device Manager (IoT DM) 510.

Queries may be generated for the network as described above. For example any IoT device may generate a query such as industrial applications, smart homes, telematics, wearables, connected cars, utilities, and eHealth. The Query handler processes any queries using the methods as described above. The query handler may be implemented in any of the elements of the network as long as they have visibility of the network to have access to the needed information to make the various calculations of the algorithm.

Figure 6:
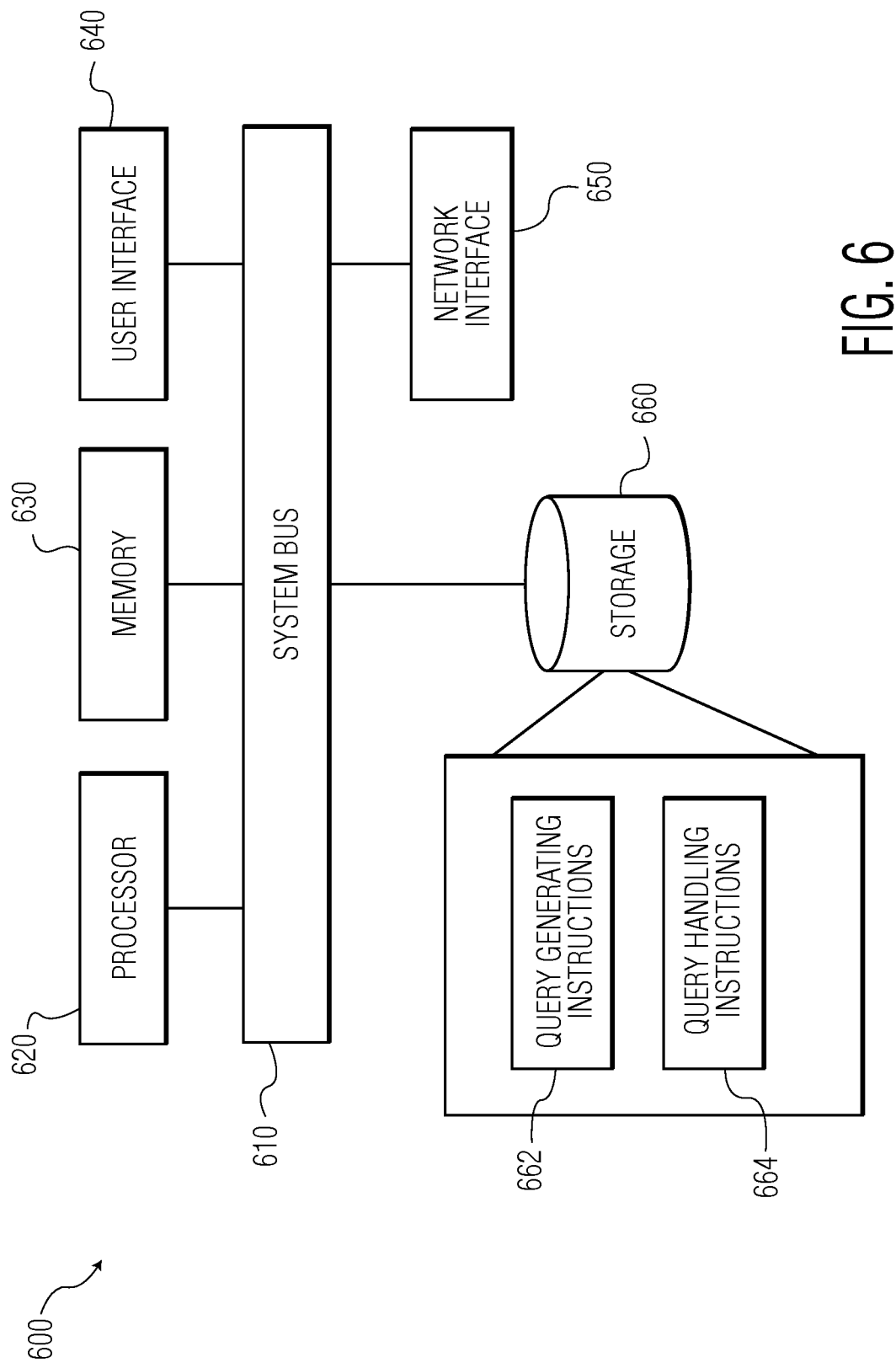
FIG. 6 illustrates an exemplary hardware diagram for a device.

FIG. 6 illustrates an exemplary hardware diagram for a device 600 such as a network element including a MME, HSS, PGW, SCEF, and SGW in a networked system. As shown, the device 600 includes a processor 620, memory 630, user interface 640, network interface 650, and storage 660 interconnected via one or more system buses 610. It will be understood that FIG. 6 constitutes, in some respects, an abstraction and that the actual organization of the components of the device 600 may be more complex than illustrated.

The processor 620 may be any hardware device capable of executing instructions stored in memory 630 or storage 660. As such, the processor may include a microprocessor, field programmable gate array (FPGA), application-specific integrated circuit (ASIC), or other similar devices.

The memory 630 may include various memories such as, for example L1, L2, or L3 cache or system memory. As such, the memory 630 may include static random access memory (SRAM), dynamic RAM (DRAM), flash memory, read only memory (ROM), or other similar memory devices.

The user interface 640 may include one or more devices for enabling communication with a user such as an administrator. For example, the user interface 640 may include a display, a mouse, and a keyboard for receiving user commands.

The network interface 650 may include one or more devices for enabling communication with other hardware devices. For example, the network interface 650 may include a network interface card (NIC) configured to communicate according to the Ethernet protocol. Additionally, the network interface 650 may implement a TCP/IP stack for communication according to the TCP/IP protocols. Various alternative or additional hardware or configurations for the network interface 650 will be apparent.

The storage 660 may include one or more machine-readable storage media such as read-only memory (ROM), random-access memory (RAM), magnetic disk storage media, optical storage media, flash-memory devices, or similar storage media. In various embodiments, the storage 660 may store instructions for execution by the processor 620 or data upon with the processor 620 may operate. For example, the storage 660 may store query generating instructions 662 for generating queries. The storage may also store query handling instructions 664 for handling queries as discussed in embodiments above.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media. Similarly, embodiments may include a data storage device encoding a program in non-transitory machine readable and machine-executable form wherein the program includes instructions to perform any method described herein.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for determining whether to admit a query in a network, the method comprising:
    determining a load for a network element in an uplink direction;
    determining a load for the network element in a downlink direction; and
    admitting the query based on the load in the uplink direction and the load in the downlink direction, wherein at least one of determining the load in the uplink direction and determining the load in the downlink direction includes:
    determining the load for the network element based on an adaptive history for a type of the network element;
    determining a cost of admitting the query based on a relative load that the query generates accounting for an amount of traffic the network element has admitted in the past;
    decreasing a total cost of the query and one or more other queries that can be budgeted during a subsequent interval when a change in load is within a specified range;
    increasing the total cost of the query and the one or more other queries that can be budgeted during a subsequent interval when the change in load is below a threshold;
    adding the query to a data structure which keeps track of potentially admittable queries: and
    for subsequent time intervals, admitting queries based upon both a determined load and a rate of change in load of each type of network element in both the downlink direction and the uplink direction and a relative load that the respective query generates.

2. The method of claim 1, wherein the determining the load for the network element based on the adaptive history includes:
    calculating the load according to:
    $Load_{DL\_NEi}$=(Average downlink Load of a plurality of network elements of type i)+(n*$\sigma_i$ (Standard Deviation) of downlink load of the plurality of network element of type i), where $Load_{DL\_NEi}$ is the representative downlink load of the network equipment of type i, for iteration i, at a beginning of the interval and n is a positive number that permits fine-tuning of aggressiveness of an algorithm implementing the method.

3. The method of claim 2, wherein determining the cost of admitting the query based on the relative load that the query generates includes:
    calculating the cost according to:
    $Cost\_Adm_{CUR\_DL\_NEi}$=sum of $Cost_{QDL}$ of mission-critical queries admitted, where $Cost\_Adm_{CUR\_DL\_NEi}$ is the sum of $Cost_{QDL}$ of queries that may be potentially admitted during the current time interval, considering the load of network element of type i in the downlink direction, and $Cost_{QDL}$= ($W_{DL1}$*DL Data volume of the query)*($W_{DL2}$(number of devices to be queried, number of network elementr of the given type)), where $W_{DL1}$ and $W_{DL2}$ are weighting factors and $W_{DL2}$ is a function f(number of devices to be queried, number of network elements of the given type).

4. The method of claim 3, wherein the change of load is within a range when: $\Delta_{DL\_Th1}<\Delta_{DL\_Load\_NEi}<\Delta_{DL\_Max}$, $\Delta_{DL\_Load\_NEi}$=(downlink load at the end of last (nth) interval−downlink load at the beginning of the first interval)/n, where $\Delta_{DL\_Max}$ and $\Delta_{DL\_Th1}$ are thresholds which are functions of $Load_{DL\_NEi}$.

5. The method of claim 4, wherein decreasing the total cost of all queries that can be budgeted includes assigning $X_{last\_DL\_NEi}=X_{last\_DL\_NEi}/Factor_{DL1}$, where $X_{last\_DL\_NEi}$ is the total cost of the query and one or more other queries that can be budgeted during the subsequent interval and $Factor_{DL1}$, is a number between 1 and 2.

6. The method of claim 5, wherein increasing the total cost of the query and one or more other queries that can be budgeted during a subsequent interval occurs when $\Delta_{DL\_Load\_NEi}<\Delta_{DL\_Th2}$; where $\Delta_{DL\_Th2}$ is a threshold which is a function of $Load_{DL\_NEi}$.

7. The method of claim 6, wherein increasing the total cost of the query and one or more other queries that can be budgeted occurs by assigning $X_{last\_DL\_NEi}$=minimum (($X_{last\_DL\_NEi}$*$Factor_{DL2}$), maximum($X_{last\_DL\_NEi}$, ($Cost\_Adm_{lsst\_DL\_NEi}$*$Factor_{DL2}$))), where $Factor_{DL2}$, is a number between 1 and 2.

8. The method of claim 7, wherein in an initial interval after calculating load and cost, assigning $X_{last\_DL\_NEi}=X_{Init\_DL\_NEi}$, where $X_{Init\_DL\_NEi}$ represents the total cost of the query and one or more other queries that can be budgeted during the initial interval and is a function f($Load_{DL\_NEi}$, total capacity of network element of type i).

9. The method of claim 2, wherein comparing the downlink load of the network element type i to the set threshold and comparing the change in the downlink load of the network element type i, averaged over the last n intervals, to a second threshold are done using comparisons according to the following expressions respectively:

$$((Load_{DL\_NEi}>=Thresh_{High\_DL}) OR (\Delta_{DL\_Load\_NEi}>=\Delta_{DL\_Max}).$$

10. The method of claim 1, further comprising:
    selecting the set of network element queries which are allowed in one or more types of network elements for consideration of admission.

11. The method of claim 1, further comprising:
    admitting mission critical queries unconditionally before time critical queries.

12. The method of claim 1, wherein queries to be admitted on one or more types of NEs are selected based on information in the data structure.

13. The method of claim 1, further comprising:
    for each type of NE (i=1 to N), calculating $Cost\_Adm_{last\_DL\_NEi}$ as the sum of $Cost_{QDL}$ of the finally selected set of admitted queries;

for each type of NE (i=1 to N), calculating Cost_Adm$_{last\_UL\_NEi}$ as the sum of Cost$_{QUL}$ of the finally selected set of admitted queries; and selecting a set of NE queries that are allowed based on the Cost_Adm$_{last\_UL\_NEi}$ and Cost_Adm$_{last\_DL\_NEi}$.

14. The method of claim 1, wherein admitting the network query includes: calculating the load according to:

Load$_{UL\_NEi}$=(Average uplink Load of a plurality of networks element of type i)+(n*σ$_i$ (Standard Deviation) of uplink load of the plurality of network elements of type i), where Load$_{UL\_NEi}$ is the representative uplink load of the network equipment of type i, for iteration i, at the beginning of the interval and n is a positive number that permits fine-tuning of the aggressiveness of the algorithm.

15. A device for determining whether to admit a query in a network, the device comprising:

a memory configured to store instructions; and a processor configured to execute the instructions to:

determine a load for a network element in an uplink direction, determine a load for the network element in a downlink direction, and admit the query based on the load in the uplink direction and the load in the downlink direction, wherein at least one of determining the load in the uplink direction and determining the load in the downlink direction includes:

determine the load for the network element based on an adaptive history for a type of the network element, determine a cost of admitting the query based on a relative load that the query generates accounting for an amount of traffic the network element has admitted in the past, decrease a total cost of the query and one or more other queries that can be budgeted during a subsequent interval when a change in load is within a specified range, increase the total cost of the query and one or more other queries that can be budgeted during subsequent interval when the change in load is below a threshold, add the query to a data structure which keeps track of potentially admittable queries; and for subsequent time intervals, admit queries based upon both a determined load and a rate of change in load of each type of network element m both the downlink direction and the uplink direction and a relative load that the respective query generates.

16. The device of claim 15, wherein the processor is further configured to select a set of network element queries which are allowed in a plurality of types of network elements for consideration of admission.

17. The device of claim 15, wherein the processor is configured to admit all mission critical queries unconditionally.

18. A data storage device encoding a program in non-transitory machine readable and machine-executable form, the program comprising instructions to:

determine a load for a network element in an uplink direction;

determine a load for the network element in a downlink direction; and admit the query based on the load in the uplink direction and the load in the downlink direction, wherein at least one of determining the load in the uplink direction and determining the load in the downlink direction includes:

determine the load for the network element based on an adaptive history for a type of the network element;

determine a cost of admitting the query based on a relative load that the query generates accounting for an amount of traffic the network element has admitted in the past;

decrease a total cost of the query and one or more other queries that can be budgeted during a subsequent interval when a change in load is within a specified range;

increase the total cost of the query and one or more other queries that can be budgeted during a subsequent interval when the change in load is below a threshold;

add the query to a data structure which keeps track of potentially admittable queries: and for subsequent time intervals, admit queries based upon both a determined load and a rate of change in load of each type of network element m both the downlink direction and the uplink direction and a relative load that the respective query generates.

19. The data storage device of claim 18, further comprising;

instructions to select the set of network element queries which are allowed in a plurality of types of network elements for consideration of admission.

20. The data storage device of claim 18, wherein mission critical queries are admitted unconditionally.

* * * * *